M. D. RUCKER.
ELASTIC TIRE FOR VEHICLES.
APPLICATION FILED JAN. 27, 1913.

1,070,183.

Patented Aug. 12, 1913.

Witnesses:

Inventor.
Martin D. Rucker
by Herbert W. Jenner
Attorney.

UNITED STATES PATENT OFFICE.

MARTIN DIEDERICH RUCKER, OF PURLEY, ENGLAND.

ELASTIC TIRE FOR VEHICLES.

1,070,183.  Specification of Letters Patent.  Patented Aug. 12, 1913.

Application filed January 27, 1913. Serial No. 744,504.

*To all whom it may concern:*

Be it known that I, MARTIN DIEDERICH RUCKER, residing at Purley, in the county of Surrey, England, have invented certain new and useful Improvements in Elastic Tires for Vehicles; and I do hereby declare the following to be a full, clear, and exact description of the invention, such as will enable others skilled in the art to which it appertains to make and use the same.

This invention relates to an improved elastic tire for vehicles, and relates to that class of tire in which a solid core of rubber in a state of permanent resilient energy takes the place of the usual inflatable inner tube.

The object of this improvement is to provide a suitable method or means for attachment of an outer covering over said core, and to secure the compound tire thus formed within a rim, capable of being mounted upon a wheel of usual construction and proportions.

I will now proceed to describe this invention more particularly by reference to the accompanying drawings in which:—

Figure 1:
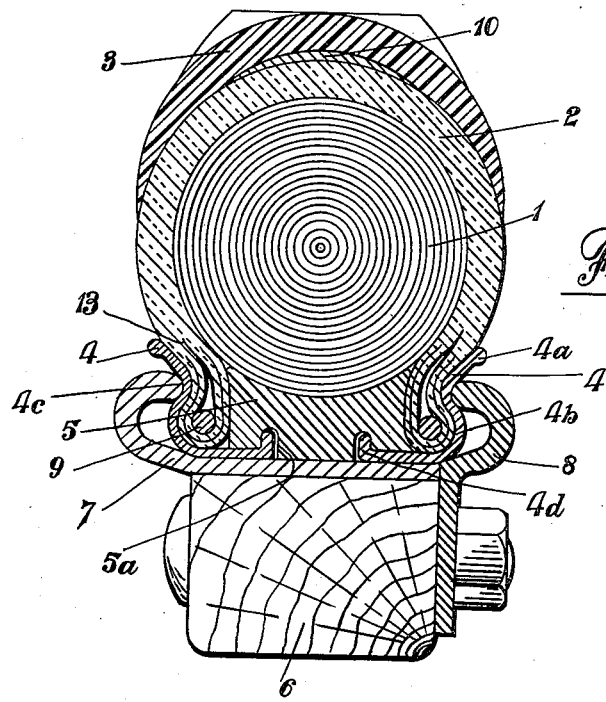
Figure 2:
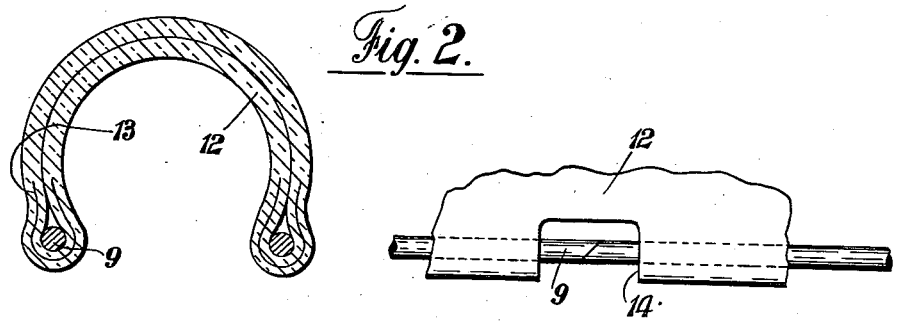
Figure 3:
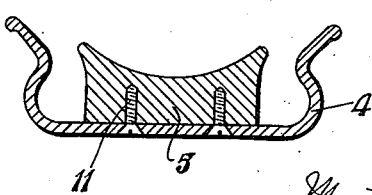

Figure 1 is a cross sectional elevation of my invention. Fig. 2 shows details of a modified form of cover, Fig. 3 shows detail of modified secondary rim.

In the drawings, 1 is the core, 2 is the outer cover, 3 is the tread, 4 are the retaining parts of the secondary rim, and 5 the locking part thereof. As a whole, the tire complete with the secondary rim is adapted to be mounted upon the wheel felly 6, which is provided with an ordinary rim part 7, and detachable flange 8. The core 1 is composed of layers or bands of rubber, rolled or wound into a core under tension, and may be of known construction. This core may be made endless or in a dis-continuous length with joined ends, in either case it being preferable that the circumferential length or ring diameter of said core be less than the diameter it is compelled to assume *in situ*. The cover 2 is provided with inextensible beads 9, said beads being preferably composed of steel or metallic wire stranded or otherwise. The material for the cover, must be good quality rubber, and such that when vulcanized, it can be stretched to accommodate the core within it, and is consequently made smaller in its untensioned state than would be sufficient to inclose the core in its tensioned or expanded state. To prevent possible abrasion between the rubber and the material forming the beads, canvas is interposed between same in pocket form, there being one, two or more layers as may be necessary, and carried a greater or lesser distance up the side-walls of the cover. It should be observed that the canvas should not extend farther than the confines of the secondary rim parts, as every fraction over this detracts from the ability of the cover to expand. If the color of the rubber cover be the same as that of the tread (as in practice it preferably is) a band 10 of different colored rubber may be placed between the tread part 3 and the cover 2.

The secondary rim may be made as shown in Fig. 1, the outer parts 4 being rolled from steel, having lips $4^a$ which form a gradually receding seat for the tire, and in addition to a pocket $4^b$ to retain the bead, each rim part has a recess $4^c$ to allow of the wheel rim parts 7 and 8 gripping same in position. Further the said parts are provided with catches $4^d$, adapted to engage recesses $5^a$, in the locking part. The locking part 5 may be, and preferably is, articulated, that is to say, built up out of a plurality of independent parts, so that when arranged circumferentially around an expanding device, they can move outward. These parts may be formed from aluminium, hard rubber, vulcanized fiber or like suitable material. The extensible abutment ring or locking ring 5, which is formed of blocks of inelastic material, fills the space between the beads of the cover and between the elastic core and the rigid rim, and operates to retain the elastic core and the elastic cover under their predetermined tension.

The operation of assembly is as follows:—The core 1 is placed within the cover, and the rim locking parts 5 are held by any suitable means around the inside circumference of the core. The whole is then placed over an expanding device, which forces the core up into the cover. The secondary rim parts placed around the beads are then forced inwardly by cramps, so that the rim catches come into position to engage with the recesses in the locking band parts 5. When the expanding pressure is released, the engagement takes place. The tire is now complete and may be mounted upon the vehicle wheel in the manner shown, or be mounted in any equivalent manner, such as employing divided rims, detachable rims, or detachable flanges.

In lieu of the locking piece described under Fig. 1, the arrangement shown in Fig. 3 may alternatively be employed. In this arrangement, the secondary rim parts are forced into position with cramps, after the core is within the cover, and while the cramps are still in position, holes are drilled through the rim parts 7 and 8, and the locking pieces 5, and studs 11 driven in flush.

In Fig. 2, is shown an alternative form of cover. In this a continuous tube of rubber 12 is provided with internal canvas strips 13, bead rings 9 are now introduced and arranged to lie against the canvas. To enable this to be done with a continuous tube, a small part 14 is cut away on one side, the beads being introduced and then joined as by acetylene welding. The latter type of weld is effected so quickly that a small piece of asbestos cloth placed between the bead and the tube adjacent to the point of fusion is all sufficient to prevent burning of the latter.

By these means a tire is produced, possessing great resilience, little resistance to motion, and which absorbs road shocks in a manner hitherto unknown. Further, owing to the parts forming the tire being in such intimate contact, there is no relative motion, and the tire remains comparatively cold at high speeds. To assist this it is preferable to apply an adhesive between the cover and core when expanding into position.

Hitherto, it has been necessary with all solid core tires of this type, to have a cover vulcanized *in situ* with the core, thus destroying in a great measure the energy originally imparted to the core. With the tire now described no vulcanizing is required when the tire is in an assembled state, the tread being cold cured in place.

I claim:—

The combination, with a core, and a loop-shaped core cover provided with beads at its edges; of a main wheel rim, a locking ring formed of circumferentially separable blocks, said blocks being provided with recesses in their undersides, and a secondary rim formed of two similar rings of inelastic material seated on the main rim and engaging with the beads of the tire cover and having catches which engage with the said recesses and hold the blocks apart, thereby retaining the core and its cover under a predetermined tension.

In testimony whereof I have affixed my signature, in presence of two witnesses.

MARTIN DIEDERICH RUCKER.

Witnesses:
O. J. WORTH,
L. E. BOIVIC.